(12) United States Patent
Razack et al.

(10) Patent No.: US 11,264,621 B2
(45) Date of Patent: Mar. 1, 2022

(54) MICROPOROUS LAYER WITH HYDROPHILIC ADDITIVES

(75) Inventors: Siddique Ali Khateeb Razack, East Windsor, CT (US); Robert Mason Darling, South Windsor, CT (US)

(73) Assignee: Audi AG, Ingolstadt (DE)

( * ) Notice: Subject to any disclaimer, the term of this patent is extended or adjusted under 35 U.S.C. 154(b) by 513 days.

(21) Appl. No.: 14/413,684

(22) PCT Filed: Jul. 19, 2012

(86) PCT No.: PCT/US2012/047386
§ 371 (c)(1),
(2), (4) Date: Jan. 8, 2015

(87) PCT Pub. No.: WO2014/014463
PCT Pub. Date: Jan. 23, 2014

(65) Prior Publication Data
US 2015/0140470 A1    May 21, 2015

(51) Int. Cl.
*H01M 4/88* (2006.01)
*H01M 8/10* (2016.01)
(Continued)

(52) U.S. Cl.
CPC ....... *H01M 4/8807* (2013.01); *H01M 4/8821* (2013.01); *H01M 8/0241* (2013.01);
(Continued)

(58) Field of Classification Search
CPC ............. H01M 4/8821; H01M 4/8807; H01M 8/0241; H01M 8/1004; H01M 8/0243;
(Continued)

(56) References Cited

U.S. PATENT DOCUMENTS

| 2001/0036570 A1 | 11/2001 | Tosco et al. |
| 2002/0071978 A1 | 6/2002 | Bekkedahl et al. |

(Continued)

FOREIGN PATENT DOCUMENTS

| CN | 1180249 A | 4/1998 |
| CN | 1949570 A | 4/2007 |

(Continued)

OTHER PUBLICATIONS

Wang, X. L., et al. "Micro-porous layer with composite carbon black for PEM fuel cells." Electrochimica Acta 51.23 (2006): 4909-4915. (Year: 2006).*

(Continued)

*Primary Examiner* — Carlos Barcena
(74) *Attorney, Agent, or Firm* — Seed IP Law Group LLP

(57) ABSTRACT

A microporous layer for use in a fuel cell includes a first carbon black having carboxyl groups at a concentration less than 0.1 mmol per gram of carbon, a hydrophobic additive and a hydrophilic additive. A method for producing a membrane electrode assembly includes preparing a microporous layer ink, applying the microporous layer ink to a first side of a gas diffusion substrate, sintering the gas diffusion substrate to form a gas diffusion layer having a first side with a microporous layer, and thermally bonding the first side of the gas diffusion layer to an electrode layer. The microporous layer ink includes a suspension medium, a first carbon black having carboxyl groups at a concentration less than 0.1 mmol per gram of carbon, a hydrophobic additive and a hydrophilic additive.

18 Claims, 5 Drawing Sheets

(51) Int. Cl.
*H01M 8/1004* (2016.01)
*H01M 8/0241* (2016.01)
*H01M 8/0243* (2016.01)
*H01M 8/0245* (2016.01)

(52) U.S. Cl.
CPC ........ *H01M 8/1004* (2013.01); *H01M 8/0243* (2013.01); *H01M 8/0245* (2013.01); *H01M 2008/1095* (2013.01)

(58) Field of Classification Search
CPC ....... H01M 8/0245; H01M 2008/1095; H01M 4/8657
See application file for complete search history.

(56) References Cited

U.S. PATENT DOCUMENTS

| | | |
|---|---|---|
| 2004/0247992 A1 | 12/2004 | Kabumoto et al. |
| 2005/0069754 A1 | 3/2005 | Kim et al. |
| 2005/0106450 A1 | 5/2005 | Castro et al. |
| 2005/0233203 A1 | 10/2005 | Hampden-Smith et al. |
| 2007/0122690 A1 | 5/2007 | Lee et al. |
| 2007/0184336 A1 | 8/2007 | Kim et al. |
| 2007/0259253 A1 | 11/2007 | Son et al. |
| 2007/0298309 A1 | 12/2007 | Vyas et al. |
| 2008/0248360 A1 | 10/2008 | Mizukami et al. |
| 2008/0299430 A1 | 12/2008 | Ichikawa et al. |
| 2009/0317686 A1 | 12/2009 | Huston et al. |
| 2010/0015490 A1 | 1/2010 | Yamada |
| 2010/0273095 A1 | 10/2010 | Li et al. |

FOREIGN PATENT DOCUMENTS

| | | |
|---|---|---|
| CN | 101038970 A | 9/2007 |
| CN | 101071877 A | 11/2007 |
| CN | 101145612 A | 3/2008 |
| CN | 101540405 A | 9/2009 |
| CN | 101752577 A | 6/2010 |
| CN | 102315457 A | 1/2012 |
| JP | 2006-19174 A | 1/2006 |
| JP | 2006-179317 A | 7/2006 |
| JP | 2006-252966 A | 9/2006 |
| JP | 2008-98066 A | 4/2008 |
| WO | 2011/087846 A1 | 7/2011 |

OTHER PUBLICATIONS

T. Kitahara, H. Nakajima, K. Mori. Hydrophilic and Hydrophobic Double MPL Coated GDL to Enhance PEFC Performance under Low and High Humidity Conditions, ECS Transactions, 41 (1) 593-601 (2011).*

Wang, "Studies on Membrane Electrode Assembly of Proton Exchange Membrane Fuel Cells," Dissertation of Doctoral Degree, Dalian Institute of Chemical Physics, Chinese Academy of Sciences, 2006. (172 pages) (w/ English Abstract).

* cited by examiner

MICROPOROUS LAYER WITH HYDROPHILIC ADDITIVES

BACKGROUND

A proton exchange membrane fuel cell (PEMFC) generally includes an anode, a cathode and a proton exchange membrane (PEM) between the anode and cathode. In one example, hydrogen gas is fed to the anode and air or pure oxygen is fed to the cathode. However, it is recognized that other types of fuels and oxidants can be used. At the anode, an anode catalyst causes the hydrogen molecules to split into protons ($H^+$) and electrons ($e^-$). The protons pass through the PEM to the cathode while the electrons travel through an external circuit to the cathode, resulting in production of electricity. At the cathode, a cathode catalyst causes the oxygen molecules to react with the protons and electrons from the anode to form water.

For the fuel cell to perform properly, the amount of water present near the cathode must be managed. On one hand, too much water present near the cathode will cause "flooding", thereby disrupting delivery of reactants (air or oxygen) to the cathode and potentially preventing fuel cell reactions. On the other hand, the loss of too much water vapor from the fuel cell can cause the PEM to dry, increasing resistance across the membrane. Eventually, the membrane will crack and form one or more paths where hydrogen and oxygen can combine directly, generating heat that can damage the fuel cell. Some fuel cells are capable of operating at both high and low temperatures. Depending on the operating temperature, water management needs can be very different. For instance, flooding is generally a larger concern at low operating temperatures, while loss of water vapor is generally a larger concern at high operating temperatures.

SUMMARY

A microporous layer for use in a fuel cell includes a first carbon black having carboxyl groups at a concentration less than 0.1 mmol per gram of carbon, a hydrophobic additive and a hydrophilic additive.

A gas diffusion electrode includes an electrode catalyst layer, a porous gas diffusion layer and a microporous layer. The gas diffusion layer has a first side proximate the electrode catalyst layer and a second side opposite the first. The microporous layer is positioned between the electrode catalyst layer and the second side of the gas diffusion layer. The microporous layer includes a first carbon black having carboxyl groups at a concentration less than 0.1 mmol per gram of carbon, a hydrophobic additive and a hydrophilic additive.

A fuel cell includes a membrane having a first membrane side and an opposite second membrane side, an anode catalyst layer positioned along the first membrane side, a cathode catalyst layer positioned along the second membrane side, a cathode gas diffusion layer having a first side proximate the cathode catalyst layer and a second side opposite the first side and a microporous layer positioned between the cathode catalyst layer and the second side of the cathode gas diffusion layer. The microporous layer includes a first carbon black having carboxyl groups at a concentration less than 0.1 mmol per gram of carbon, a hydrophobic additive and a hydrophilic additive.

A method for producing a membrane electrode assembly includes preparing a microporous layer ink, applying the microporous layer ink to a first side of a gas diffusion substrate, sintering the gas diffusion substrate to form a gas diffusion layer having a first side with a microporous layer, and thermally bonding the first side of the gas diffusion layer to an electrode layer. The microporous layer ink includes a suspension medium, a first carbon black having carboxyl groups at a concentration less than 0.1 mmol per gram of carbon, a hydrophobic additive and a hydrophilic additive. The hydrophilic additive is selected from tin oxide, titanium dioxide, and a second carbon black having a concentration of carboxyl groups greater than the first carbon black.

DETAILED DESCRIPTION

Fuel cells convert chemical energy to electrical energy using one or more fuel cell repeat units. The fuel cell repeat unit described herein includes a microporous layer near the cathode and/or anode electrodes to assist with water management. The microporous layer includes a hydrophilic additive that enables water management during both low- and high-temperature operation, providing a fuel cell capable of operating at both low and high temperatures.

Figure 1:
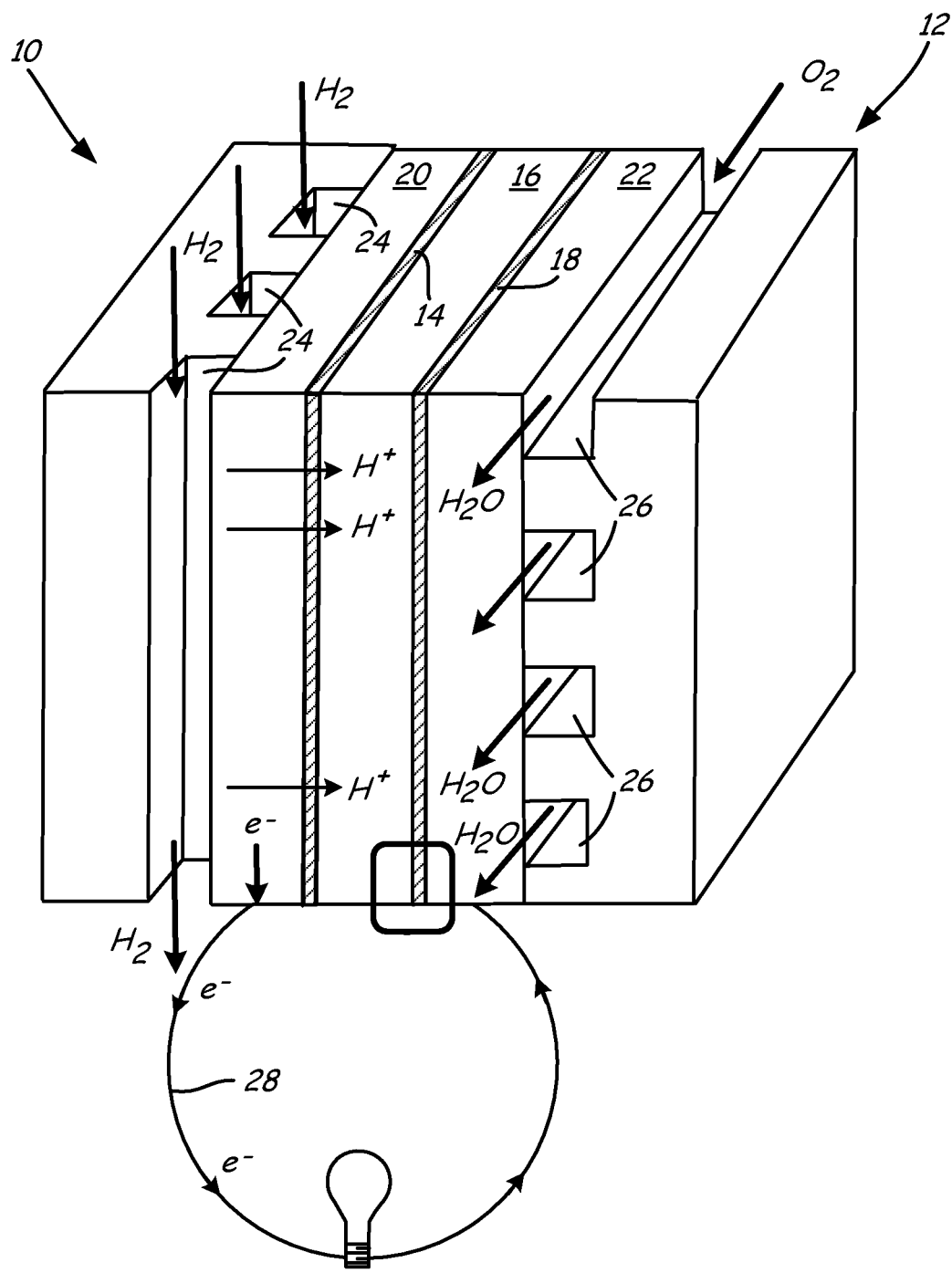
FIG. 1 is a perspective view of a fuel cell repeat unit.

FIG. 1 illustrates a perspective view of one example fuel cell repeat unit 10, which includes membrane electrode assembly (MEA) 12 (having anode catalyst layer (CL) 14, membrane 16 and cathode catalyst layer (CL) 18), anode gas diffusion layer (GDL) 20, cathode gas diffusion layer (GDL) 22, anode flow field 24 and cathode flow field 26. Fuel cell repeat unit 10 can have coolant flow fields adjacent to anode flow field 24 and cathode flow field 26. Coolant flow fields are not illustrated in FIG. 1.

Anode GDL 20 faces anode flow field 24 and cathode GDL 22 faces cathode flow field 26. Anode CL 14 is positioned between anode GDL 20, and membrane 16 and cathode CL 18 is positioned between cathode GDL 22 and membrane 16. In one example, fuel cell repeat unit 10 can be a polymer electrolyte membrane (PEM) fuel cell that uses hydrogen fuel (e.g., hydrogen gas) and oxygen oxidant (e.g., oxygen gas or air). It is recognized that fuel cell repeat unit 10 can use alternative fuels and/or oxidants.

In operation, anode GDL 20 receives hydrogen gas ($H_2$) by way of anode flow field 24. Hydrogen gas travels through GDL 20 to anode CL 14. Anode CL 14, which contains a catalyst such as platinum, causes the hydrogen molecules to split into protons ($H^+$) and electrons ($e^-$). The protons and electrons travel to cathode CL 18; the protons pass through membrane 16 to cathode CL 18, while the electrons travel through external circuit 28, resulting in production of electrical power. Air or pure oxygen ($O_2$) is supplied to cathode GDL 22 through cathode flow field 26. Oxygen travels through GDL 22 to cathode CL 18. At cathode CL 18, oxygen molecules react with the protons and electrons from anode CL 14 to form water ($H_2O$). Eventually, some of the produced water, along with excess heat, exits fuel cell 10.

Membrane 16 is a semi-permeable membrane located between anode CL 14 and cathode CL 18. Membrane 16 allows movement of protons and water but does not conduct electrons. Protons and water from anode CL 14 can move through membrane 16 to cathode CL 18. Membrane 16 can be formed of an ionomer. An ionomer is a polymer with ionic properties. In one example, membrane 16 is formed of a perfluorosulfonic acid (PFSA)-containing ionomer, such as Nafion® by E.I. DuPont™, USA. PFSA polymers are composed of fluorocarbon backbones with sulfonate groups attached to short fluorocarbon side chains.

In another example, membrane 16 is formed of a hydrocarbon ionomer. In general, the main chains of hydrocarbon ionomers do not contain large amounts of fluorine, unlike PFSA ionomers which have highly fluorinated backbones. A hydrocarbon ionomer is an ionomer having a main chain which contains hydrogen and carbon, and which may also contain a small mole fraction of hetero atoms such as oxygen, nitrogen, sulfur, and/or phosphorus. These hydrocarbon ionomers primarily include aromatic and aliphatic ionomers. Examples of suitable aromatic ionomers include but are not limited to sulfonated polyimides, sulfoalkylated polysulfones, poly(β-phenylene) substituted with sulfophenoxy benzyl groups, and polybenzimidazole ionomers. Non-limiting examples of suitable aliphatic ionomers are those based upon vinyl polymers, such as cross-linked poly(styrene sulfonic acid), poly(acrylic acid), poly(vinylsulfonic acid), poly(2-acrylamide-2-methylpropanesulfonic acid) and their copolymers.

The composition of membrane 16 affects the operating temperature of fuel cell repeat unit 10. For example, hydrocarbon ionomers typically have a higher glass transition temperature than PFSA ionomers, which enables a hydrocarbon ionomer membrane 16 to be operated at a higher temperature than a PFSA ionomer membrane 16.

Cathode CL 18 is adjacent to the cathode side of membrane 16. Cathode CL 18 includes an ionomer and a catalyst. The catalyst of cathode CL 18 promotes electrochemical reduction of oxidant (i.e., oxygen). Example catalysts for cathode CL 18 include carbon-supported platinum particles, carbon-supported alloys of platinum and carbon-supported platinum intermetallics.

Anode CL 14 is adjacent to the anode side of membrane 16, and opposite cathode CL 18. Anode CL 14 includes a catalyst. The catalyst of anode CL 14 promotes electrochemical oxidation of fuel (i.e., hydrogen). Example catalysts for anode CL 14 include carbon-supported platinum particles. Anode CL 14 can also include an ionomer. Anode CL 14 can have a structure similar to that described above for cathode CL 18, although anode CL 14 and cathode CL 18 can have different compositions.

Figure 2:
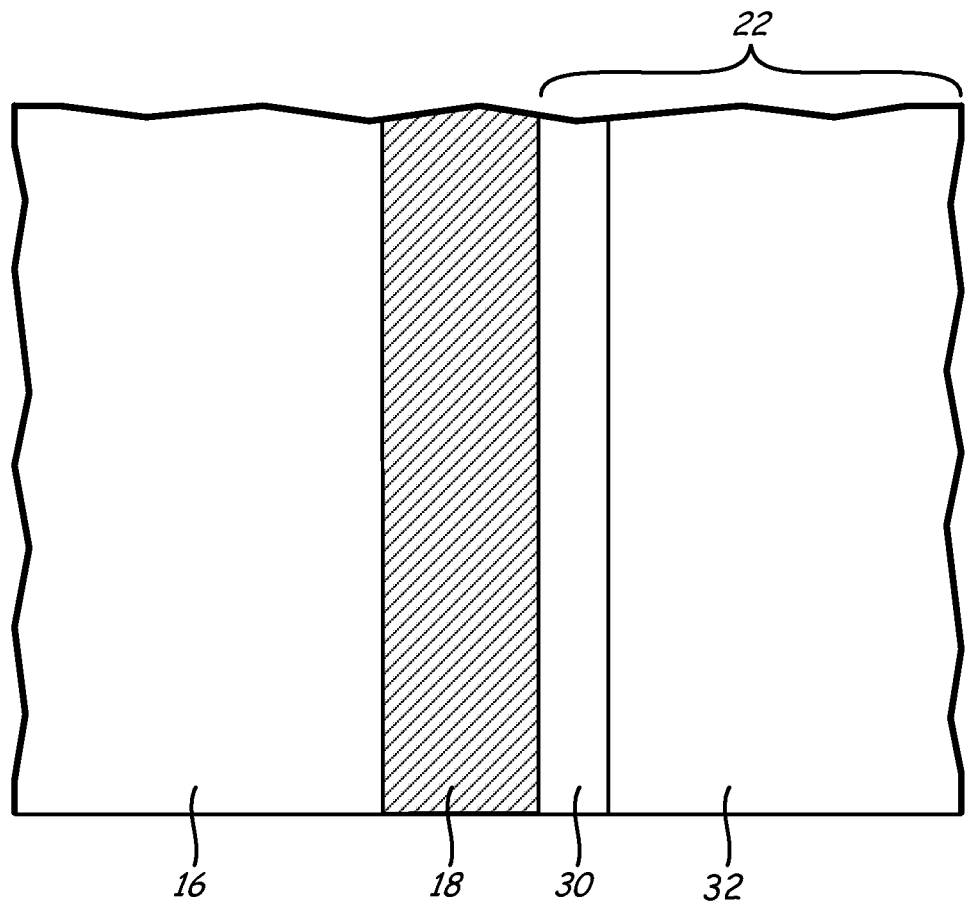
FIG. 2 is an enlarged view of the electrode, gas diffusion and microporous layers of the fuel cell repeat unit of FIG. 1.

FIG. 2 is an enlarged view of membrane 16, cathode CL 18 and cathode GDL 22 of MEA 12 of FIG. 1. Cathode GDL 22 includes gas diffusion substrate 32 and microporous layer 30. As shown in FIG. 2, microporous layer 30 is a membrane layer located on the side of cathode GDL 22 nearest cathode CL 18 and between cathode CL 18 and gas diffusion substrate 32. Alternatively, microporous layer 30 can be located within the pores of gas diffusion substrate 32. As described below in greater detail, microporous layer 30 includes a suspension medium, a first carbon black, a hydrophobic additive and a hydrophilic additive.

As noted above, the protons and electrons from anode CL 14 react with oxygen molecules at cathode CL 18 to form water. At low operating temperatures (generally less than about 50° C.), the water formed at cathode CL 18 must be managed to prevent the accumulation of water at cathode CL 18. Water accumulation in this area of the fuel cell can disrupt the delivery of oxygen to cathode CL 18. Thus, some of the water formed at cathode CL 18 must be diverted away from cathode CL 18 so that water does not accumulate and cause flooding. Hydrophobic moieties (i.e., functional groups) in microporous layer 30 encourage water near cathode CL 18 to enter cathode GDL 22 and migrate away from cathode CL 18 to prevent flooding.

At high operating temperatures (generally between about 75° C. and about 105° C.), the loss of water vapor near cathode CL 18 must be managed to prevent electrode 16 from drying out. At high temperatures, increased water retention is needed to keep the fuel cell operating effectively. While hydrophobic moieties located near cathode CL 18 can prevent flooding, they do not increase the fuel cell's ability to retain water near cathode CL 18. Therefore, gas diffusion layers (with or without microporous layers) containing only hydrophobic moieties are not ideal for high operating temperatures. The present invention provides a microporous layer that overcomes these obstacles and allows a fuel cell to operate at both low and high temperatures (i.e., temperatures between about 0° C. and about 110° C.).

Microporous layer 30 is a membrane layer located between cathode CL 18 and gas diffusion substrate 32 or within the pores of gas diffusion substrate 32. Microporous layer 30 is formed as a single layer and its composition is generally uniform (e.g., microporous layer 30 does not include a hydrophobic side and a separate hydrophilic side). In embodiments in which microporous layer 30 is a discrete layer between cathode CL 18 and gas diffusion substrate 32, microporous layer 30 has a thickness between about 1 micron and about 50 microns. Microporous layer 30 contains pores. The pores of microporous layer 30 form a network of interconnected pores from one side of microporous layer 30 to the other. In some embodiments, the average pore diameter of the pores of microporous layer is less than about 5 microns. The average pore diameter of the pores of microporous layer can also be less than about 1 micron.

As noted above, microporous layer 30 includes a first carbon black, a hydrophobic additive and a hydrophilic additive. A suspension medium used in microporous layer 30 allows the first carbon black and hydrophobic and hydrophilic additives to be mixed together uniformly to produce a microporous layer ink. In some embodiments, the suspension medium is water. All or a portion of the suspension medium can evaporate during preparation of the microporous layer ink or the forming of MEA 12.

Microporous layer 30 includes a first carbon black. Carbon black is used in microporous layer 30 and gas diffusion layers for its conductive properties and its ability to provide a porous network for the reactant and product flow fields. In catalyst layers, carbon black is also used as a support for catalyst particles. The first carbon black used in microporous layer 30 serves as a conductor and provides a network of small pores (i.e., the microporous layer pores are generally smaller than the pores in gas diffusion substrate 32).

Carbon black particles often contain different functional groups on their outer surface. These functional groups can alter the properties of the carbon black particles. Some of these functional groups are acidic and include, but are not limited to, carboxyl groups, lactone groups and phenol groups. The first carbon black particles have a relatively low concentration of carboxyl groups. On average, the first carbon black particles contain carboxyl groups at a concentration less than 0.1 millimoles (mmol) per gram of carbon. In some embodiments, the first carbon black contains less than about 0.2 mmol of acidic functional groups per gram of carbon. Additionally, in some embodiments, the first carbon black has an average particle diameter greater than about 25 nm and an average surface area less than about 300 $m^2/g$. In some embodiments, the first carbon black is Vulcan® XC-72R available from Cabot® Corporation, Shawinigan Black™ acetylene black (SAB) available from Chevron Phillips™ or Ketjenblack® available from Akzo Nobel™.

Microporous layer 30 also includes a hydrophobic additive. The hydrophobic additive is used in microporous layer 30 to prevent flooding near cathode CL 18. The hydrophobic additive repels water near the interface of cathode CL 18 and microporous layer 30 and directs the flow of water into gas diffusion substrate 32, away from cathode CL 18. In some embodiments, the hydrophobic additive includes Teflon® (polytetrafluoroethylene) available from DuPont™. In some embodiments, the amount of hydrophobic additive present in microporous layer 30 is between about 5 percent by weight and about 50 percent by weight of the amount of first carbon black. In one embodiment, the amount of hydrophobic additive present in microporous layer 30 relative to the amount of first carbon black is between about 15 percent by weight and about 25 percent by weight.

Microporous layer 30 further includes a hydrophilic additive. The hydrophilic additive prevents flooding near cathode CL 18 at low temperatures while also retaining water near cathode CL 18 at high temperatures. Examples of suitable hydrophilic additives include, but are not limited to, tin oxide ($SnO_2$), titanium dioxide ($TiO_2$) and a second carbon black. Black Pearls® 2000 and Black Pearls® 1000 (both available from Cabot® Corporation) are two examples of carbon blacks suitable as the second carbon black. The second carbon black, such as Black Pearls® 2000 (or 1000), differs from the first carbon black, such as Vulcan® XC-72R. In particular, the second carbon black differs from the first carbon black with respect to one or more of the following: the functional groups present on the particle surface, particle diameter and surface area. For example, in some embodiments, the second carbon black contains carboxyl functional groups at a concentration greater than 0.2 mmol per gram of carbon. In some embodiments, the second carbon black contains more than about 0.5 mmol of acidic functional groups per gram of carbon. In still other embodiments, between 40% and 80% of the acidic functional groups present on the second carbon black are carboxyl groups. For instance, on average, Black Pearls® 1000 contains about 0.5 mmol of carboxyl groups per gram of carbon, and about 65% of the acidic functional groups on the surfaces of the carbon black particles are carboxyl groups. Turning to particle diameter and surface area, Black Pearls® 2000 has an average particle diameter of about 15 nm and an average surface area as high as about 1475 $m^2/g$, while Vulcan® XC-72 has an average particle diameter of about 30 nm and an average surface area of about 254 $m^2/g$. In some embodiments, the second carbon black has an average particle diameter less than about 20 nm and an average surface area greater than about 400 $m^2/g$. By utilizing a second carbon black having a higher concentration of carboxyl groups, reduced particle size and/or increased surface area, microporous layer 30 includes a hydrophilic additive that aids water management near cathode CL 18 as described in greater detail below.

In other embodiments, the hydrophilic additive can be a wettable carbon black formed by heating the first carbon black in microporous layer 30. Heating microporous layer 30 to a temperature between about 300° C. and about 500° C. removes some of the hydrophobic functional groups present on the first carbon black. By removing these hydrophobic functional groups, some of the first carbon black becomes more hydrophilic and wettable. By heating microporous layer 30 containing only the first carbon black (and no other second carbon black), some of the first carbon black is converted into wettable carbon black, a hydrophilic additive.

In some embodiments, the amount of hydrophilic additive present in microporous layer 30 is between about 1 percent by weight and about 25 percent by weight of the amount of first carbon black. In one embodiment, the amount of hydrophilic additive present in microporous layer 30 relative to the amount of first carbon black is between about 5 percent by weight and about 15 percent by weight.

The hydrophilic additive provides microporous layer 30 with different water managing properties at low and high temperature operation. At low temperatures, the hydrophilic additive helps to prevent the accumulation of water at the interface of cathode CL 18 and cathode GDL 22. As described above, microporous layer 30 has small pores. These small pores encourage the movement of water from cathode CL 18 through microporous layer 30 to cathode CL 18 by capillary action. Capillary action allows the water to flow through the pores of microporous layer 30 without the aid of gravity or other external means. The small pores of microporous layer 30 encourage the water to move away from cathode CL 18 by "wicking". The hydrophilic additives attract water molecules to microporous layer 30. Once the water molecules have been "attracted" to microporous layer 30, the water molecules are wicked away from cathode CL 18 by the capillary action forces of the small pores. The hydrophobic additives present in microporous layer 30 also contribute to the water removal process at low temperature. The hydrophobic additives divert water molecules towards the hydrophilic additives.

At high temperatures, the hydrophilic additive in microporous layer 30 helps to prevent the loss of water vapor at the interface of cathode CL 18 and cathode GDL 22. At high temperatures, water in MEA 12 vaporizes more readily and is more easily removed from cathode GDL 22 and electrode 16. The small pores of microporous layer 30 and the high surface area of the hydrophilic additive help retain water vapor in microporous layer 30, preventing the area near cathode CL 18 from drying out. The small pores of microporous layer 30 trap water vapor molecules. Water vapor molecules exit large pores more easily than small pores. Additionally, the high surface area of hydrophilic additives such as Black Pearls® 2000 creates a tortuous network of pores within microporous layer 30. This tortuous network makes it even more difficult for water vapor to escape from the pores, allowing the pores of microporous layer 30 to retain water vapor more readily than the larger pores of gas diffusion substrate 32. As the reactant gas (air/oxygen) flows more readily through the larger pores of gas diffusion substrate 32, the small pores of microporous layer 30 containing trapped water vapor do not hinder the flow of oxygen to cathode CL 18.

Microporous layer 30 can also include a surfactant, such as Triton™ X-100. While microporous layer 30 has been discussed above with respect to cathode CL 18 and cathode GDL 22, microporous layer 30 can also be located similarly with respect to anode CL 14 and anode GDL 20 and function in the same manner.

Figure 3:
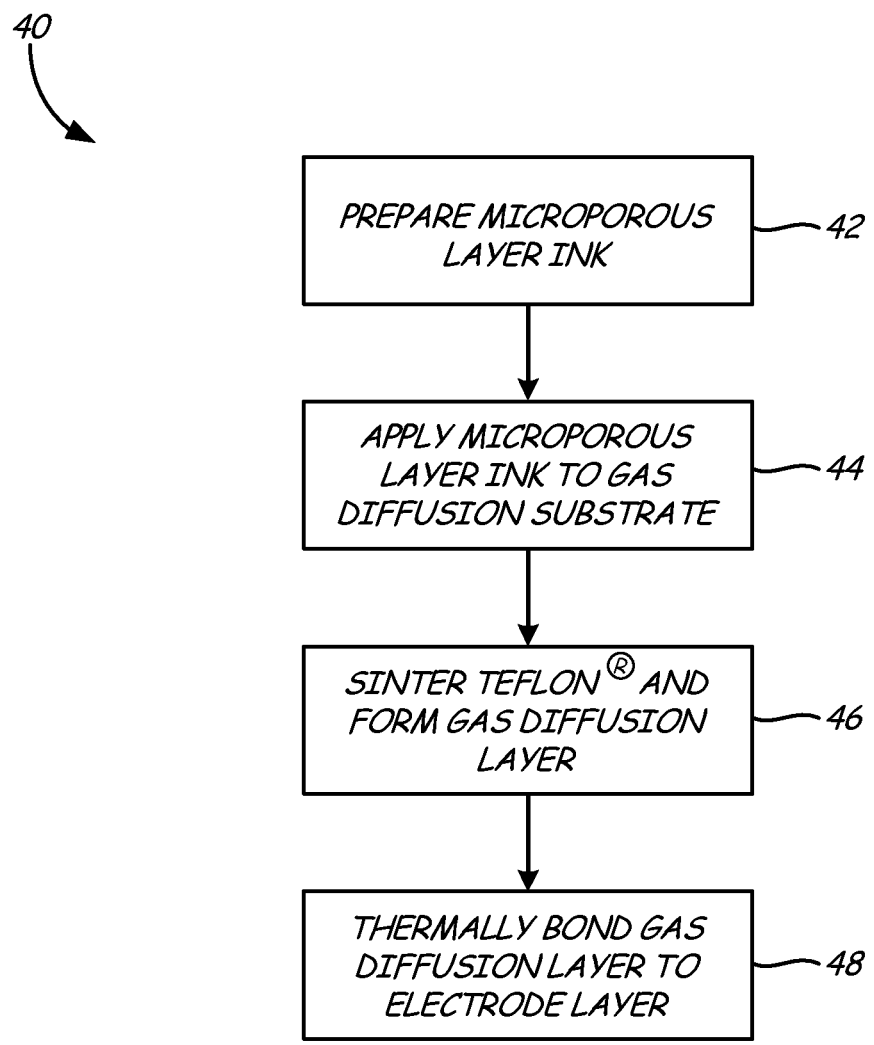
FIG. 3 is a simplified flow diagram illustrating a method for producing a unitized electrode assembly.

Microporous layer 30 described above can be incorporated into MEA 12 in different ways. FIG. 3 illustrates a simplified flow diagram showing one embodiment of a method for producing part of MEA 12. In method 40, a microporous layer ink is prepared in step 42. The microporous layer ink includes a suspension medium, carbon black, a hydrophobic additive and a hydrophilic additive, as described above. The microporous layer ink is prepared by mixing together the ink constituents. Once prepared, the microporous layer ink is applied to a first side of gas diffusion substrate 32 in step 44. The microporous layer ink can be applied to gas diffusion substrate 32 by spraying, rod coating and other deposition techniques known in the art.

Once the microporous layer ink has been applied to gas diffusion substrate 32, the combination ink-gas diffusion substrate can be dried at low temperature to remove water in order to prevent or reduce surface cracking. Drying can be performed in a vacuum oven at a temperature between about 30° C. and about 50° C. under vacuum for at least about 30 minutes to slowly remove water without causing large surface cracks. The combined ink-gas diffusion substrate is then heated to sinter Teflon® in microporous layer 30 and gas diffusion substrate 32 and also fuse microporous layer 30 onto gas diffusion substrate 32 in step 46 to form a gas diffusion layer (e.g., cathode GDL 22). The combined ink-gas diffusion substrate is heated to a temperature between about 250° C. and about 350° C. in step 46. The temperature used in sintering step 46 will depend on the hydrophobic additive used in the microporous layer ink. For example, for Teflon®, a suitable temperature is between about 310° C. and about 350° C. For fluorinated ethylene propylenes, such as Teflon® FEP, a suitable temperature is between about 250° C. and about 275° C. Once the gas diffusion layer has been formed, the side of the gas diffusion layer containing microporous layer 30 is thermally bonded to an electrode layer (e.g., cathode CL 18) in step 48. Step 48 can include hot pressing and/or other thermal bonding techniques known in the art. Following step 48, MEA 12 can be prepared according to customary practices.

Example

A microporous layer was prepared for testing using the reagents and amounts shown in Table 1.

TABLE 1

| Material | Wt (g) | Wt % |
|---|---|---|
| Water | 48 | 95.3 |
| Triton ™ X-100 | 0.16 | 0.32 |
| Vulcan ® XC-72R | 1.6 | 3.18 |
| Teflon ® Dispersion (TE-3893) | 0.32 | 0.64 |
| Black Pearls ® 1000 | 0.29 | 0.58 |
| Total | 50.37 | 100.0 |
| % Teflon ® solid in MPL after sintering | | 10% |
| % Black Pearls ® 1000 in MPL after sintering | | 14% |

Vulcan® XC-72R was used as the first carbon black, the Teflon® dispersion was used as the hydrophobic additive and Black Pearls® 1000 was used as the hydrophilic additive (second carbon black).

The above described microporous layer was used to form a gas diffusion layer that was placed in a fuel cell. Another fuel cell was prepared with a gas diffusion layer having the microporous layer described above except that the Black Pearls® 1000 was omitted from the microporous layer. Testing of both fuel cells was conducted according to the conditions shown in Table 2.

TABLE 2

| Test | Fuel | Oxidant | Cell Temperature (° C.) | Fuel Dew Point (° C.) | Oxidant Dew Point (° C.) | Gas Pressure (kPa) | Fuel Utilization | Oxidant Utilization |
|---|---|---|---|---|---|---|---|---|
| 1 | Pure $H_2$ | Air | 50 | Dry | Dry | 40 | 60% | 67% |
| 2 | Pure $H_2$ | Air | 80 | 53 | 53 | 100 | 83% | 67% |

Figure 4:
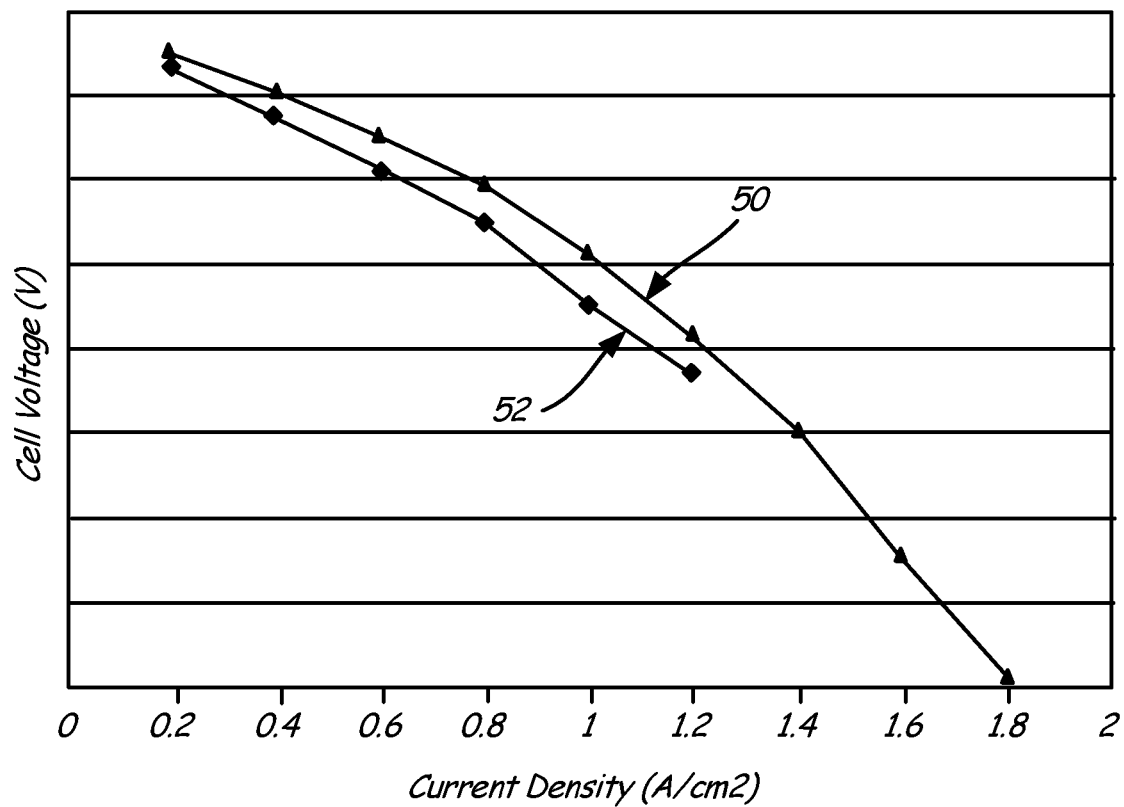
FIG. 4 is a graph illustrating testing results for microporous layers with and without hydrophilic additives.

Test 1 describes low temperature and dry conditions. FIG. 4 is a graph illustrating the Test 1 performance of the fuel cell having the microporous layer with the hydrophilic additive (curve 50) and the fuel cell having the microporous layer without the hydrophilic additive (curve 52). As shown in FIG. 4, the fuel cell having the microporous layer with the hydrophilic additive exhibited a higher cell voltage than the fuel cell lacking the hydrophilic additive, especially at higher current densities. At lower temperatures, most of the water produced at the cathode exists in a liquid state. Rapid removal of water from the cathode catalyst layer is crucial in order for oxygen to be transported to catalyst sites. Without adequate removal of water, gas transport losses dominate and reduce cell performance. As shown by the higher cell voltage in FIG. 4, the addition of the hydrophilic additive in the microporous layer improves cell performance, enabling the cell to operate at high current densities.

Figure 5:
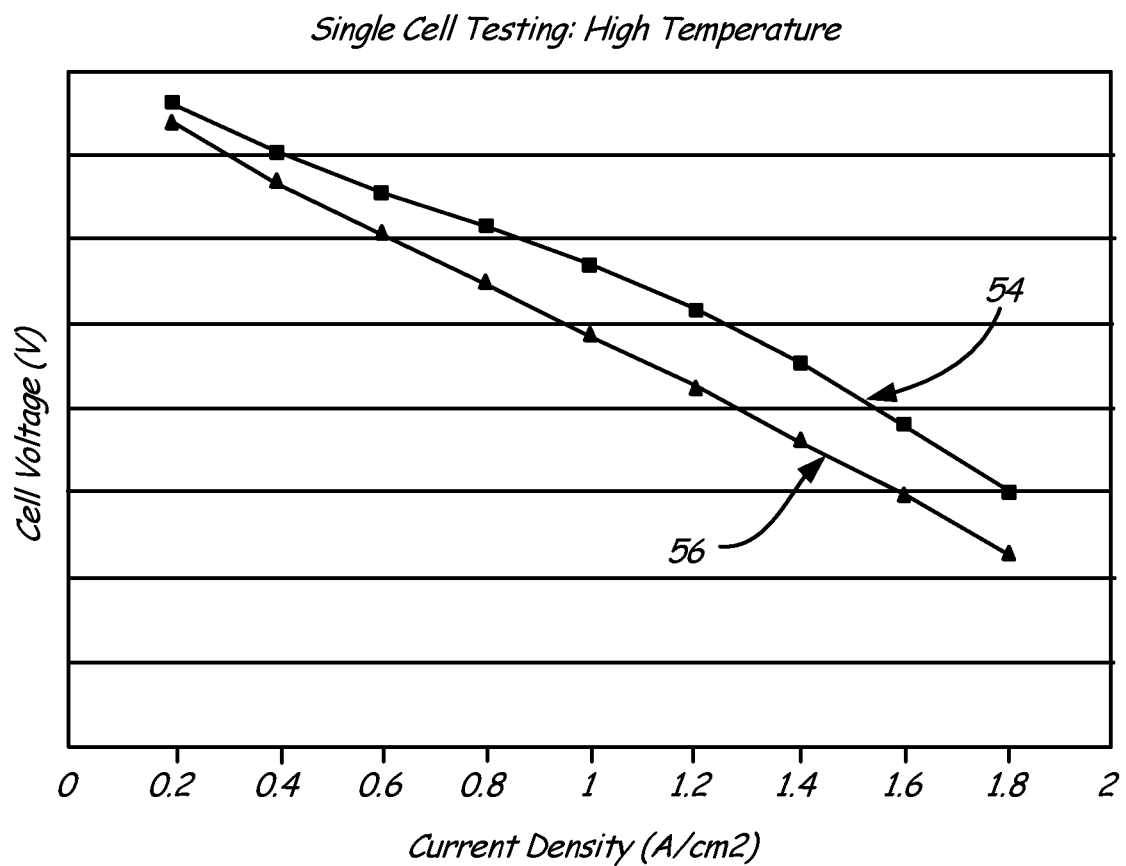
FIG. 5 is another graph illustrating testing results for microporous layers with and without hydrophilic additives

Test 2 describes a high temperature condition. FIG. 5 is a graph illustrating the Test 2 performance of the fuel cell having the microporous layer with the hydrophilic additive (curve 54) and the fuel cell having the microporous layer without the hydrophilic additive (curve 56). Again, the fuel cell having the microporous layer with the hydrophilic additive exhibited a higher cell voltage than the fuel cell without the hydrophilic additive. At low humidity conditions, ionomer- and membrane-related losses dominate because of reduced proton conductivity, poor gas transport through dry ionomer film and high membrane resistivity. FIG. 5 shows that cell performance improves significantly when the hydrophilic additive is present in the microporous layer. Significant voltage gain was observed in the ohmic region (0.6 A/cm$^2$ to 1.4 A/cm$^2$). This demonstrates that the hydrophilic additive in the microporous layer results in better hydration of the catalyst layer ionomer, thereby improving proton conductivity and oxygen transport through the ionomer film. Additionally, no mass transport related loss occurs due to the presence of the Black Pearls® 1000.

The cell testing results shown in FIGS. 4 and 5 demonstrate that hydrophilic additives in the microporous layer improve performance of the cell at high operating temperatures as well as at low operating temperatures. At high temperatures, the hydrophilic additive increases the water hydration level of the catalyst layer ionomer, thereby improving conductivity and oxygen transport through the ionomer film. This occurs because the hydrophilic additive helps to retain water in its microscopic pores that increases the humidity of incoming gas. At low temperatures, the hydrophilic additive helps to quickly remove water from catalyst pores, thereby improving the oxygen transport rate in the catalyst layer. This occurs because of the faster wicking of product water from the catalyst layer via the fine pores of the hydrophilic additive in the microporous layer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A microporous layer for use in a fuel cell, the microporous layer comprising:
    a first carbon black having first carboxyl groups at a concentration less than 0.1 mmol per gram of carbon;
    a hydrophobic additive at an amount that is about 15 percent to about 25 percent by weight relative to the amount of the first carbon black in the microporous layer; and
    a hydrophilic additive comprising:
        a second carbon black having second carboxyl groups at a concentration greater than 0.2 mmol per gram of carbon, a reduced average particle size as compared to the first carbon black, and an increased average surface area as compared to the first carbon black, the second carboxyl groups being between 40% and 80% of total acidic functional groups of the second carbon black; and
        an oxide selected from the group of tin oxide, titanium dioxide and combinations thereof,
        wherein the hydrophilic additive is at an amount that is about 5 percent to about 15 percent by weight relative to the amount of the first carbon black in the microporous layer,
    wherein the microporous layer comprises a composition of the first carbon black, the hydrophobic additive and the hydrophilic additive that is homogenous through a thickness of the microporous layer.

2. The microporous layer of claim 1, wherein the first carbon black has an average particle diameter greater than about 25 nm and an average surface area less than about 300 $m^2/g$.

3. The microporous layer of claim 1, wherein the hydrophobic additive comprises polytetrafluoroethylene.

4. The microporous layer of claim 1, wherein the average particle size of the second carbon black is a diameter smaller than about 20 nm, and the average surface area of the second carbon black is greater than about 400 $m^2/g$.

5. The microporous layer of claim 1, wherein the hydrophilic additive comprises a wettable carbon black formed by heating the microporous layer to a temperature between about 300° C. and 500° C. in an oxidizing environment.

6. The microporous layer of claim 1, wherein the microporous layer has a thickness between about 1 micron and about 50 microns, and wherein the microporous layer has an average pore size less than about 5 microns.

7. The microporous layer of claim 1, the microporous layer further comprising a surfactant.

8. The microporous layer of claim 7, wherein the surfactant is at an amount that is 10 percent by weight relative to the amount of the first carbon black in the microporous layer.

9. A gas diffusion electrode comprising:
    an electrode catalyst layer;
    a porous gas diffusion layer having a first side proximate the electrode catalyst layer and a second side opposite the first side; and
    a microporous layer positioned between the electrode catalyst layer and the second side of the gas diffusion layer, the microporous layer comprising:
        a first carbon black having first carboxyl groups at a concentration less than 0.1 mmol per gram of carbon;
        a hydrophobic additive at an amount that is about 15 percent to about 25 percent by weight relative to the amount of the first carbon black in the microporous layer; and
        a hydrophilic additive comprising:
            a second carbon black having second carboxyl groups at a concentration greater than 0.2 mmol per gram of carbon, a reduced average particle size as compared to the first carbon black, and an increased average surface area as compared to the first carbon black, the second carboxyl groups being between 40% and 80% of total acidic functional groups of the second carbon black; and
            an oxide selected from the group of tin oxide, titanium dioxide and combinations thereof,
            wherein the hydrophilic additive is at an amount that is about 5 percent to about 15 percent by weight relative to the amount of the first carbon black in the microporous layer,
        wherein the microporous layer comprises a composition of the first carbon black, the hydrophobic additive and the hydrophilic additive that is homogenous through a thickness of the microporous layer.

10. The gas diffusion electrode of claim 9, wherein the hydrophobic additive comprises polytetrafluoroethylene.

11. The gas diffusion electrode of claim 9, wherein the average particle size of the second carbon black is a diameter smaller than about 20 nm, and the average surface area of the second carbon black is greater than about 400 $m^2/g$.

12. The gas diffusion electrode of claim 9, wherein the hydrophilic additive comprises a wettable carbon black formed by heating the microporous layer to a temperature between about 300° C. and 500° C. in an oxidizing environment.

13. The gas diffusion electrode of claim 9, wherein the microporous layer has a thickness between about 1 micron and about 50 microns, and wherein the microporous layer has an average pore size less than about 5 microns.

14. The gas diffusion electrode of claim 9, wherein the microporous layer is positioned between the electrode catalyst layer and the first side of the gas diffusion layer.

15. The gas diffusion electrode of claim 9, wherein the microporous layer is positioned within the pores of the gas diffusion layer.

16. A fuel cell comprising:
    a membrane having a first membrane side and an opposite second membrane side;
    an anode catalyst layer positioned along the first membrane side; a cathode catalyst layer positioned along the second membrane side;
    a cathode gas diffusion layer having a first side proximate the cathode catalyst layer and a second side opposite the first side; and
    a microporous layer positioned between the cathode catalyst layer and the second side of the cathode gas diffusion layer, the microporous layer comprising:

a first carbon black having first carboxyl groups at a concentration less than 0.1 mmol per gram of carbon;

a hydrophobic additive at an amount that is about 15 percent to about 25 percent by weight relative to the amount of the first carbon black in the microporous layer; and a hydrophilic additive comprising:
   a second carbon black having second carboxyl groups at a concentration greater than 0.2 mmol per gram of carbon, a reduced average particle size as compared to the first carbon black, and an increased average surface area as compared to the first carbon black, the second carboxyl groups being between 40% and 80% of total acidic functional groups of the second carbon black; and
   an oxide selected from the group of tin oxide, titanium dioxide and combinations thereof,
   wherein the hydrophilic additive is at an amount that is about 5 percent to about 15 percent by weight relative to the amount of the first carbon black in the microporous layer,
wherein the microporous layer comprises a composition of the first carbon black, the hydrophobic additive and the hydrophilic additive that is homogenous through a thickness of the microporous layer.

17. A method for producing a membrane electrode assembly, the method comprising:
preparing a microporous layer ink comprising a suspension medium, a first carbon black, a hydrophobic additive at an amount that is about 15 percent to about 25 percent by weight relative to the amount of the first carbon black in the microporous layer ink, and a hydrophilic additive, wherein the first carbon black contains first carboxyl groups at a concentration less than 0.1 mmol per gram of carbon, wherein the hydrophilic additive comprises a second carbon black having second carboxyl groups at a concentration greater than 0.2 mmol per gram of carbon, a reduced average particle size as compared to the first carbon black, and an increased average surface area as compared to the first carbon black, the second carboxyl groups being between 40% and 80% of total acidic functional groups of the second carbon black, wherein the hydrophilic additive further comprises an oxide selected from the group of tin oxide, titanium dioxide and combinations thereof, wherein the hydrophilic additive is at an amount that is about 5 percent to about 15 percent by weight relative to the amount of the first carbon black in the microporous layer ink, the microporous layer ink having a homogenous composition of the first carbon black, the hydrophobic additive, and the hydrophilic additive;

applying a layer of the microporous layer ink to a first side of a gas diffusion substrate, such that the homogenous composition is maintained through a thickness of the layer;

sintering the gas diffusion substrate to form a gas diffusion layer having a first side with a microporous layer; and thermally bonding the first side of the gas diffusion layer to an electrode layer.

18. The method of claim 17, wherein the hydrophilic additive is wettable carbon black formed by heating the microporous layer ink to a temperature between about 300° C. and 500° C. in an oxidizing environment prior to application to the first side of a gas diffusion substrate.

* * * * *